Dec. 6, 1938. W. I. HARNSBERGER 2,139,407
AUTOMOBILE DIRECTION SIGNAL
Filed Sept. 23, 1935
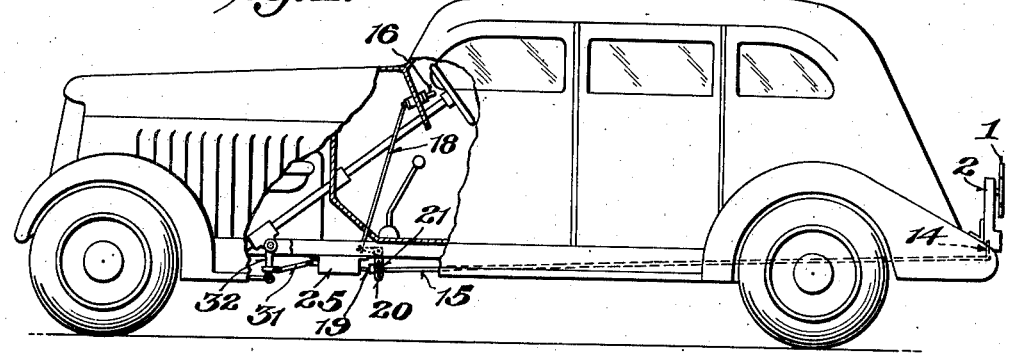
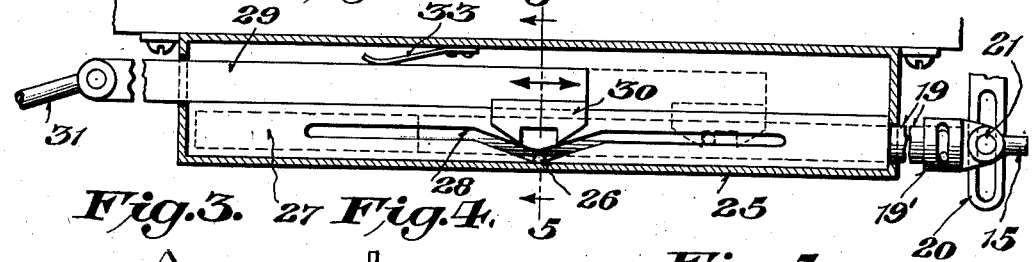
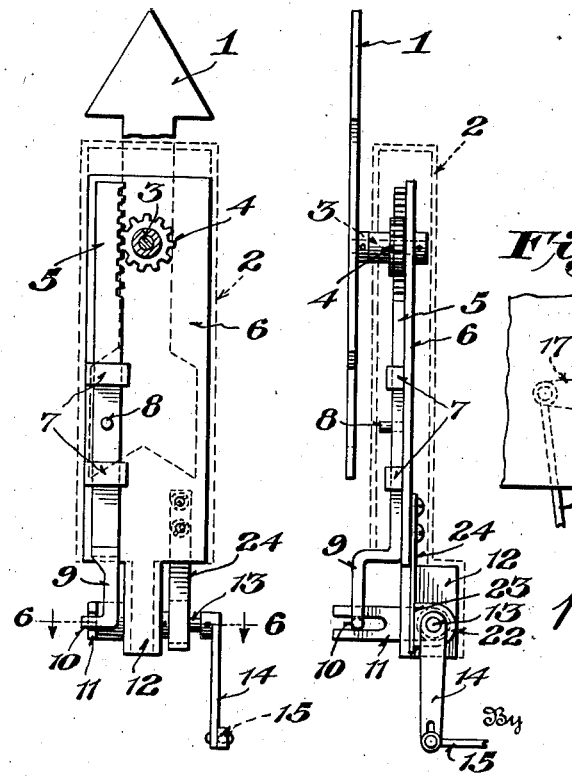
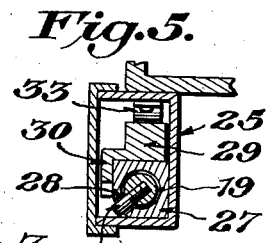
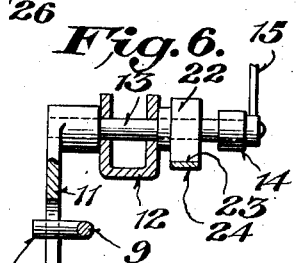

Patented Dec. 6, 1938

2,139,407

UNITED STATES PATENT OFFICE 2,139,407

AUTOMOBILE DIRECTION SIGNAL

William Ingles Harnsberger, Grottoes, Va.

Application September 23, 1935, Serial No. 41,798

2 Claims. (Cl. 116—36)

This invention relates to automobile direction signals, and the primary object thereof is to provide improved means for automatically restoring the signal arm to normal position, following manual operation thereof, upon the automobile completing its turning.

A further object of the invention is to provide means of the type set forth, which is positive in operation, and which is of simple and economical construction, and which also involves a minimum of parts that are compactly assembled.

The invention has still further and other objects which will be later set forth and manifested in the course of the following discription.

In the drawing:

Fig. 1 is a side elevation of an automobile, partly broken away and showing the present invention applied thereto;

Fig. 2 is an enlarged sectional detail view of the signal restoring means;

Fig. 3 is a detail rear elevation of the signal arm and its operating means;

Fig. 4 is a side elevation of Fig. 3;

Fig. 5 is a section on line 5—5 of Fig. 2;

Fig. 6 is a section on line 6—6 of Fig. 3 and

Fig. 7 is a detail view of the means for setting the signal arm.

The signal arm 1 is mounted on a casing 2 at the rear of the automobile, and is fixed on a shaft 3 journaled in the casing. A pinion 4 is rigidly affixed to the shaft and is actuated by the teeth of a rack 5, which latter slides against a plate 6 and through a pair of spaced guides 7 carried by the plate. A pin 8 secured to the rack engages one of the guides according to its direction of turning to stop movement of the rack and thereby of the signal arm to hold the latter in selected signalling position. Thus the guides function in a dual manner. The lower end of the rack is provided with an offset part 9, which latter has an out-turned end 10 that extends through and between the furcations of a bifurcated arm 11. The lower end of plate 6 is formed with a reduced U-shaped part 12 in which a shaft 13 is journaled and to which latter the arm 11 is rigidly affixed. A crank arm 14 is also rigidly connected to the shaft 13 and is connected to the rear end of an operating rod 15. For the purpose of operating the rod 15 thereby to effect setting of the signal, a manually operated arm 16 is pivotally mounted on the instrument board of the automobile and has a crank arm 17 connected thereto, which latter actuates a rod 18 that in turn actuates a bell crank 20 pivotally connected to the chassis of the automobile. One arm of the bell crank is slotted to receive a pin 21 that is carried by the rod 15. The instrument board bears indicia "left" and "right" between which the arm 16 moves so that it will be seen upon movement of the latter according to the direction in which the machine is to be turned, the rod 15 will be moved and through the crank arm 14 actuate the arm 11 and thereby the rack 5, the rack in turn actuating the pinion 4 to move the signal arm 1 to signalling position, either to the right or left of Fig. 3 to thus indicate the turn which the automobile is to make.

In order to insure the signal arm 1 maintaining its neutral position should same be meddled with by mischievous persons, by moving the arm from the rear of the automobile, when the latter is parked, a collar 22 is mounted on the shaft 13 which has a straight face 23 engaged by a spring 24 secured to the plate 6, so that regardless of the direction in which the arm 1 may be turned through tampering or meddling, same will be restored to its neutral position.

Referring to Fig. 2 it will be seen that there is a bar 19 that slides in a housing 25 fixed to the chassis and has a radial pin 26 constituting a catch fixed thereto. The bar 19 is connected to the rod 15 by means of swivel connection 19', the function of said swivel connection being hereinafter more fully described.

Fixed within the casing 25 is a camming member 27 which has a substantially V-shaped camming slot 28 into which the pin 26 projects. The member 27 is formed with a bore to turnably and slidably receive the bar 19, whereby the pin 26 carried by said bar 19 will follow the cam slot 28 due to the swivel connection 19'. Superimposed on the member 27 is a detent 29 which has slidable and pivotal movement within the casing 25 and is formed with a dog 30 bifurcated to receive the pin 26. The detent 29 has its front end extending through the casing 25 and is pivoted to a link 31 which latter in turn is connected to the usual steering arm 32 of the automobile. The detent 29 is normally urged against the member 27 by a spring 33 that is secured to the casing 15 and bears on top of the detent 29. The detent 29 has sliding and pivotal movement within the casing 25 so as to permit the dog 30 through its cam faces to ride over the pin 26 to connect with the latter.

In operation, when the driver is about to make a turn, he moves the arm 16 toward "left" or "right" as the case may be, thus through the rod 15 and associated parts causing the signal arm 1 to be correspondingly rotated. This movement of the rod 15 causes the pin 26 of bar 19, to be correspondingly moved either to the right or left as shown in Fig. 2 according to the turn to be made.

Turning of the automobile effects movement of the steering arm 32 with the result that the detent 29 is correspondingly moved and due to the cam edges of the dog 30 thereof, the latter rides upwardly over the pin 26 thus causing the latter to be received between the furcations of the dog so that upon the automobile resuming its straight course or completing its turn, the detent 29 will follow the movement of the steering arm 32 and will restore the bar 19 to normal position wherein, as shown in Fig. 2, the pin 26 is at the center of the camming slot 28. Fig. 2 in dotted lines illustrates the pin 26 in one of the horizontal ends of the slot 28 and also the detent 29 with its dog 30 engaged with the pin 26 in a position to restore the rod 15 and thereby the signal arm 1 to normal position upon turning of the steering arm 32 in movement of the latter to cause the automobile to resume its straight course.

When the detent 29 returns to its normal position, it will be seen that since same moves the bar 19 with it, the pin 26 will be moved into the center of slot 28 at which point the dog 30 is freed of its engagement with the pin.

What is claimed is:

1. In an automobile direction signal, a signalling member, means to operate the member to indicate the directional movement of the automobile, a slidable and turnable element having a projection thereon and connected to the operating means for simultaneous movement therewith, a member having a camming slot in which the projection is received so that upon movement of the slidable and turnable element the projection will be moved along the slot and laterally thereof, a slidable and pivotal detent having means to engage the projection, and means operable by the steering arm of the automobile upon turning the latter to cause said detent to be moved to a position to engage said projection whereby upon the automobile resuming its straight course to cause reverse movement of the detent and thereby the projection to restore the slidable and pivotal element and the signalling member to normal position.

2. In an automobile direction signal, a signalling member, means to operate the member to indicate the directional movement of the automobile, an element mounted on the automobile for rectilinear and axial rotative movement and connected to the operating means for simultaneous movement therewith, stationary means mounted on the automobile and disposed in the path of said element, said stationary means and element being constructed and arranged to cause rotation of the latter as the same is moved to a predetermined point in its rectilinear movement, and a slidable and rockable member connected to the steering mechanism of the automobile and movable thereby to a position where it engages said element when the steering mechanism has been operated to make a turn, and to return said element and thereby the signalling member to normal position when the automobile has resumed a straight course.

WILLIAM INGLES HARNSBERGER.